(12) United States Patent
Croak et al.

(10) Patent No.: US 7,734,021 B1
(45) Date of Patent: Jun. 8, 2010

(54) METHOD AND APPARATUS FOR SUPPORTING OUT OF AREA PHONE NUMBER FOR EMERGENCY SERVICES

(75) Inventors: Marian Croak, Fair Haven, NJ (US); Hossein Eslambolchi, Los Altos Hills, CA (US)

(73) Assignee: AT&T Corp., New York, NY (US)

( * ) Notice: Subject to any disclaimer, the term of this patent is extended or adjusted under 35 U.S.C. 154(b) by 662 days.

(21) Appl. No.: 11/322,453

(22) Filed: Dec. 31, 2005

(51) Int. Cl.
H04M 11/04 (2006.01)
(52) U.S. Cl. .................. 379/45; 455/404.2; 455/521
(58) Field of Classification Search ............. 370/352, 370/379.5; 379/207.13, 45; 455/404.1, 404.2, 455/521
See application file for complete search history.

(56) References Cited

U.S. PATENT DOCUMENTS

| | | | | |
|---|---|---|---|---|
| 6,151,385 | A * | 11/2000 | Reich et al. | 379/49 |
| 7,042,985 | B1 * | 5/2006 | Wright | 379/45 |
| 7,079,627 | B2 * | 7/2006 | Crago et al. | 379/45 |
| 7,260,186 | B2 * | 8/2007 | Zhu et al. | 379/45 |
| 7,433,673 | B1 * | 10/2008 | Everson et al. | 455/404.1 |
| 2003/0007482 | A1 * | 1/2003 | Khello et al. | 370/352 |
| 2004/0057425 | A1 * | 3/2004 | Brouwer et al. | 370/352 |
| 2005/0083911 | A1 * | 4/2005 | Grabelsky et al. | 370/352 |
| 2005/0213565 | A1 * | 9/2005 | Barclay et al. | 370/352 |
| 2005/0213716 | A1 * | 9/2005 | Zhu et al. | 379/45 |
| 2006/0039539 | A1 * | 2/2006 | Goldman et al. | 379/45 |
| 2006/0188083 | A1 * | 8/2006 | Breen et al. | 379/221.13 |
| 2006/0193447 | A1 * | 8/2006 | Schwartz | 379/45 |
| 2006/0252407 | A1 * | 11/2006 | Goldman et al. | 455/404.1 |
| 2006/0270384 | A1 * | 11/2006 | Sahim et al. | 455/404.2 |
| 2006/0280164 | A1 * | 12/2006 | Dickinson et al. | 370/352 |
| 2007/0047692 | A1 * | 3/2007 | Dickinson et al. | 379/41 |
| 2007/0070990 | A1 * | 3/2007 | Chong et al. | 370/356 |
| 2007/0081635 | A1 * | 4/2007 | Croak et al. | 379/39 |
| 2007/0127452 | A1 * | 6/2007 | Croy | 370/356 |
| 2007/0147345 | A1 * | 6/2007 | Lowmaster | 370/352 |
| 2009/0110154 | A1 * | 4/2009 | Colunga | 379/45 |

* cited by examiner

*Primary Examiner*—Olisa Anwah

(57) ABSTRACT

A method and apparatus for enabling a service provider to map a subscriber service address to a specific Public Safety Answering Point (PSAP) and then provides an association between the subscriber's out of area phone number and the correct PSAP are disclosed. When the subscriber places an emergency call, such as an E911 call, the network performs a database lookup obtaining the corresponding PSAP associated with the subscriber's service address and routes the call to that PSAP accordingly.

17 Claims, 4 Drawing Sheets

US 7,734,021 B1

METHOD AND APPARATUS FOR SUPPORTING OUT OF AREA PHONE NUMBER FOR EMERGENCY SERVICES

The present invention relates generally to communication networks and, more particularly, to a method and apparatus for supporting out of area phone number for emergency, e.g., E911, services in communication networks, e.g. packet networks such as Voice over Internet Protocol (VoIP) networks.

BACKGROUND OF THE INVENTION

VoIP service providers often provide their subscribers the ability to connect to network services from anywhere in the world via broadband IP access. For a variety of reasons, a subscriber sometimes desires to have a telephone number that is not within the local calling area of their service address. For example, a New Jersey resident can obtain a telephone number with an area code for California. VoIP service providers find it challenging to provide these out of area subscribers with the same level of safety associated with E911 services that depend on the service address and the phone number of a subscriber to belong to the same local calling area. E911 is an emergency response service that allows emergency personnel at a Public Safety Answering Point (PSAP) to respond to the emergency call and receive the location of a caller placing the emergency call and the calling party phone number. A PSAP is an emergency response center that is responsible for answering E911 calls for emergency assistance from police, fire and ambulance services.

Therefore, a need exists for a method and apparatus for supporting out of area phone number for emergency, e.g., E911, services in a packet network, e.g., a VoIP network.

SUMMARY OF THE INVENTION

In one embodiment, the present invention enables a service provider to map a subscriber service address to a specific PSAP and then provides an association between the subscriber's out of area phone number and the correct PSAP. When the subscriber places an emergency call, such as an E911 call, the network performs a database lookup obtaining the corresponding PSAP associated with the subscriber's service address and routes the call to that PSAP accordingly.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
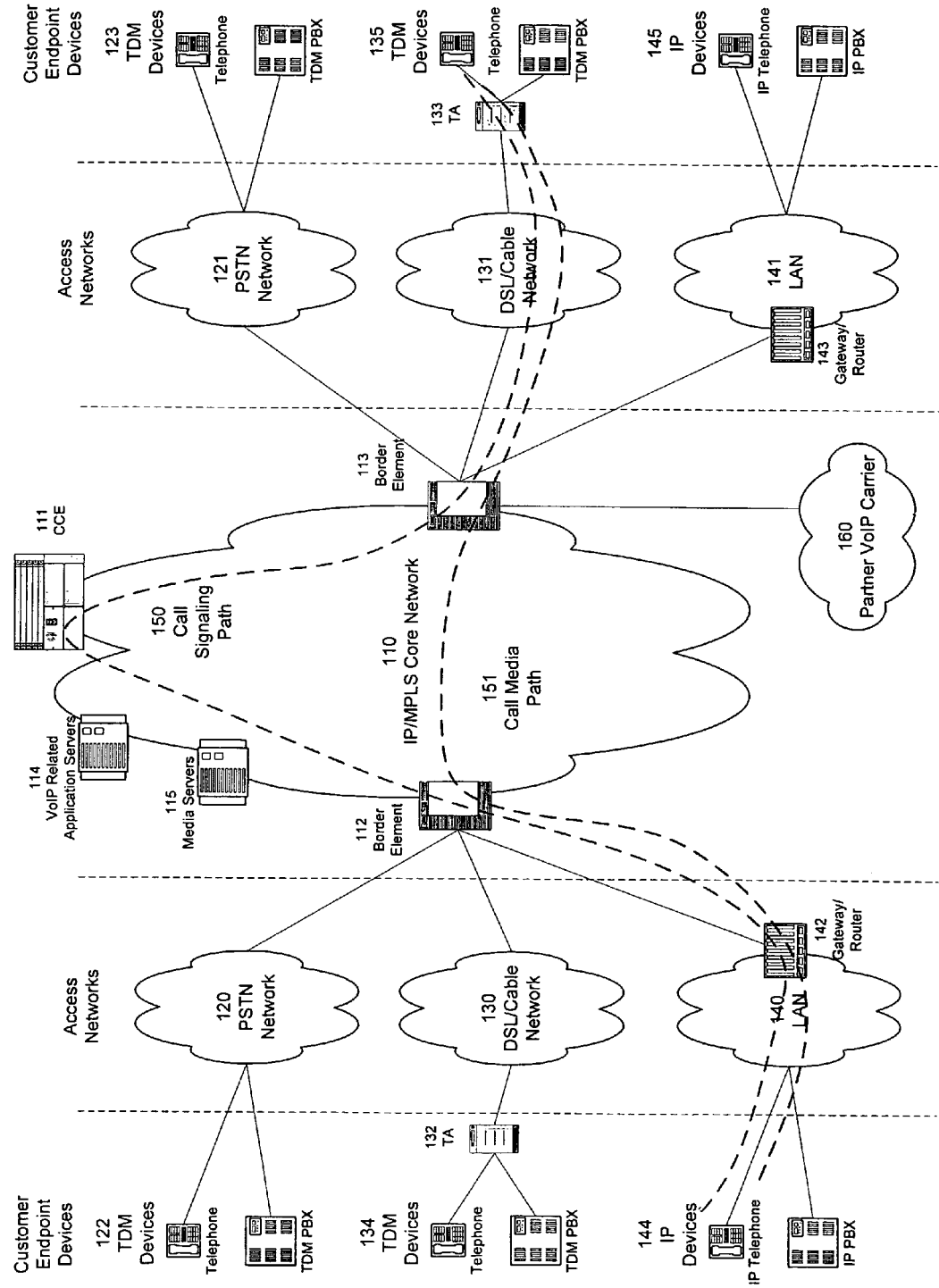
FIG. 1 illustrates an exemplary Voice over Internet Protocol (VoIP) network related to the present invention.

To better understand the present invention, FIG. 1 illustrates a communication architecture 100 having an example network, e.g., a packet network such as a VoIP network related to the present invention. Exemplary packet networks include internet protocol (IP) networks, asynchronous transfer mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted to be limited by this particular illustrative architecture.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or IP PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such the Border Element (BE) 112 and 113, the Call Control Element (CCE) 111, VoIP related Application Servers (AS) 114, and Media Server (MS) 115. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller or a softswitch and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related Application Servers (AS) in order to complete a call that require certain service specific features, e.g. translation of an E.164 voice network address into an IP address.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related application server 114 to obtain the information to complete this call. In one embodiment, the Application Server (AS) functions as a SIP back-to-back user agent. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP 200 OK response message if SIP is used, is sent in the reverse direction back to the CCE 111. After the CCE 111 receives the call acknowledgement message, it will then send a call acknowledgement signaling message, such as a SIP 200 OK response message if SIP is used, toward the calling party. In addition, the CCE 111 also provides the necessary information of the call to both BE 112 and BE 113 so that the call data exchange can proceed directly between BE 112 and BE 113. The call signaling path 150 and the call media path 151 are illustratively shown in FIG. 1. Note that the call signaling path and the call media path are different because once a call has been setup up between two endpoints, the CCE 111 does not need to be in the data path for actual direct data exchange.

Media Servers (MS) 115 are special servers that typically handle and terminate media streams, and to provide services such as announcements, teleconference bridges, transcoding, and Interactive Voice Response (IVR) messages for VoIP service applications.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

VoIP service providers often provide their subscribers the ability to connect to network services from anywhere in the world via broadband IP access. For a variety of reasons, a subscriber sometimes desires to have a telephone number that is not within the local calling area of their service address. For example, a New Jersey resident can obtain a California telephone number. VoIP service providers find it challenging to provide these out of area subscribers with the same level of safety associated with E911 services that depend on the service address and the phone number of a subscriber to belong to the same local calling area. E911 is an emergency response service that allows emergency personnel at a Public Safety Answering Point (PSAP) to respond to the emergency call and receive the location of a caller placing the emergency call and the calling party phone number. A PSAP is an emergency response center that is responsible for answering E911 calls for emergency assistance from police, fire and ambulance services.

To address this need, the present invention enables a service provider to map a subscriber service address to a specific PSAP and then provides an association between the subscriber's out of area phone number and the correct PSAP. When the subscriber places an emergency call, such as an E911 call, the network performs a database lookup obtaining the corresponding PSAP associated with the subscriber's service address and routes the call to that PSAP accordingly.

Figure 2:
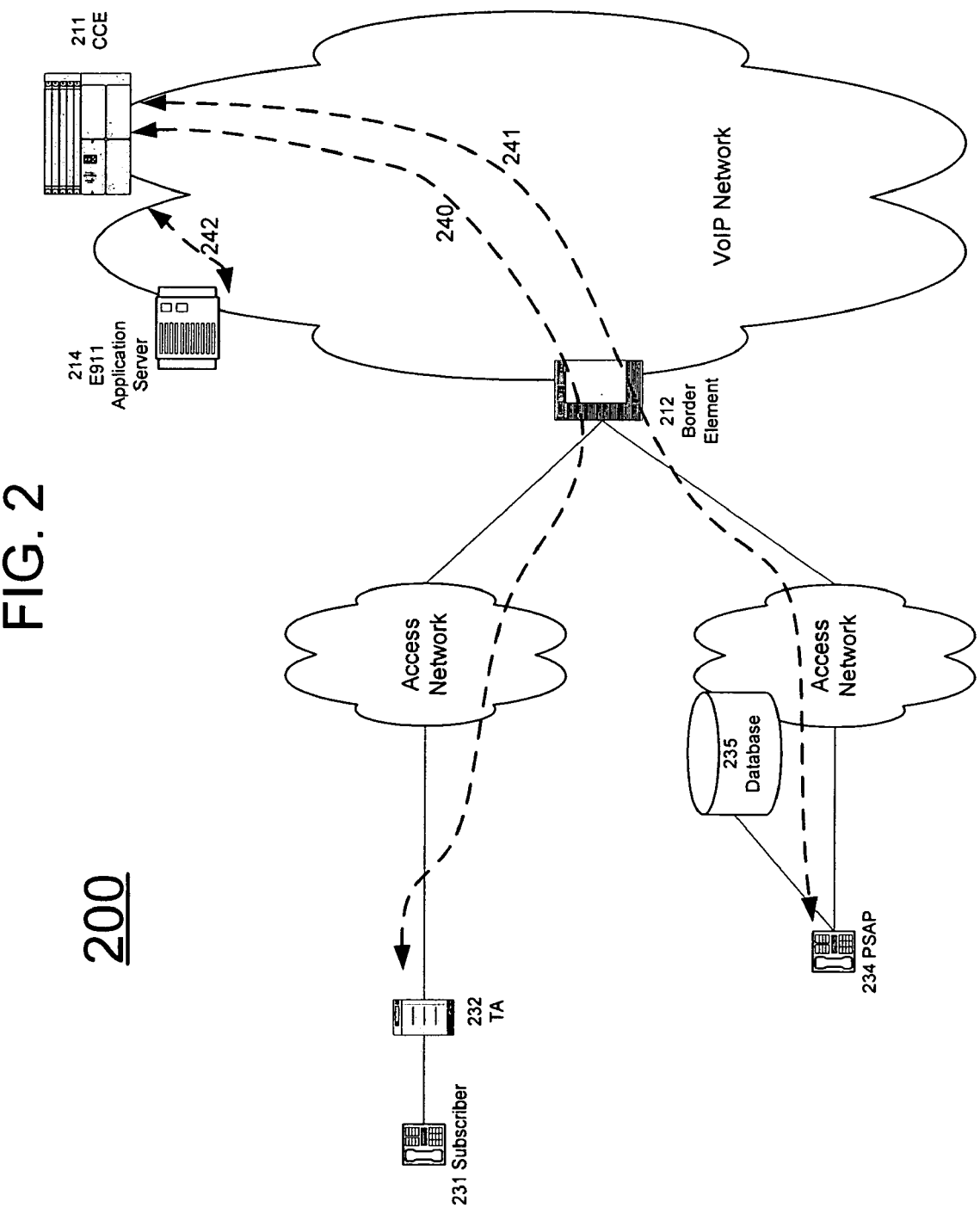
FIG. 2 illustrates an example of supporting out of area phone number for E911 services in a VoIP network of the present invention.

FIG. 2 illustrates an example 200 of supporting out of area phone number for E911 services in a packet network, e.g., a VoIP network of the present invention. In FIG. 2, subscriber 231 subscribes to an out of area phone number. In other words, subscriber 231 subscribes to a VoIP phone number with an area code that doesn't belong to the same local calling area of the registered service address. For instance, subscriber 231 accesses the VoIP services from a home office located in New Jersey and the registered service address is therefore in New Jersey. However, subscriber 231 has chosen a phone number with a California area code for the subscribed VoIP services. In other words, the out of area phone number reflects a completely different geographic location from the service address associated with the subscriber. When subscriber 231 makes an E911 call to request emergency assistance, TA 232 sends the E911 call setup message to CCE 211 using flow 240 for call establishment. Upon receiving the E911 call setup message, CCE 211 communicates with E911 AS 214 using flow 242 to obtain the service address of subscriber 231 as well as the appropriate PSAP, e.g., PSAP 234 in this instance, to which the call is to be routed to handle the E911 call. Then CCE 211 forwards the E911 call setup message along with the subscriber's out of area phone number and the obtained subscriber service address via BE 212 to PSAP 234 and its associated database system, such as Database 235, to complete the E911 call using flow 241. When PSAP 234 receives the E911 call, the emergency dispatcher who answers the call will have the correct physical address information of subscriber 231 for dispatch purposes.

Figure 3:
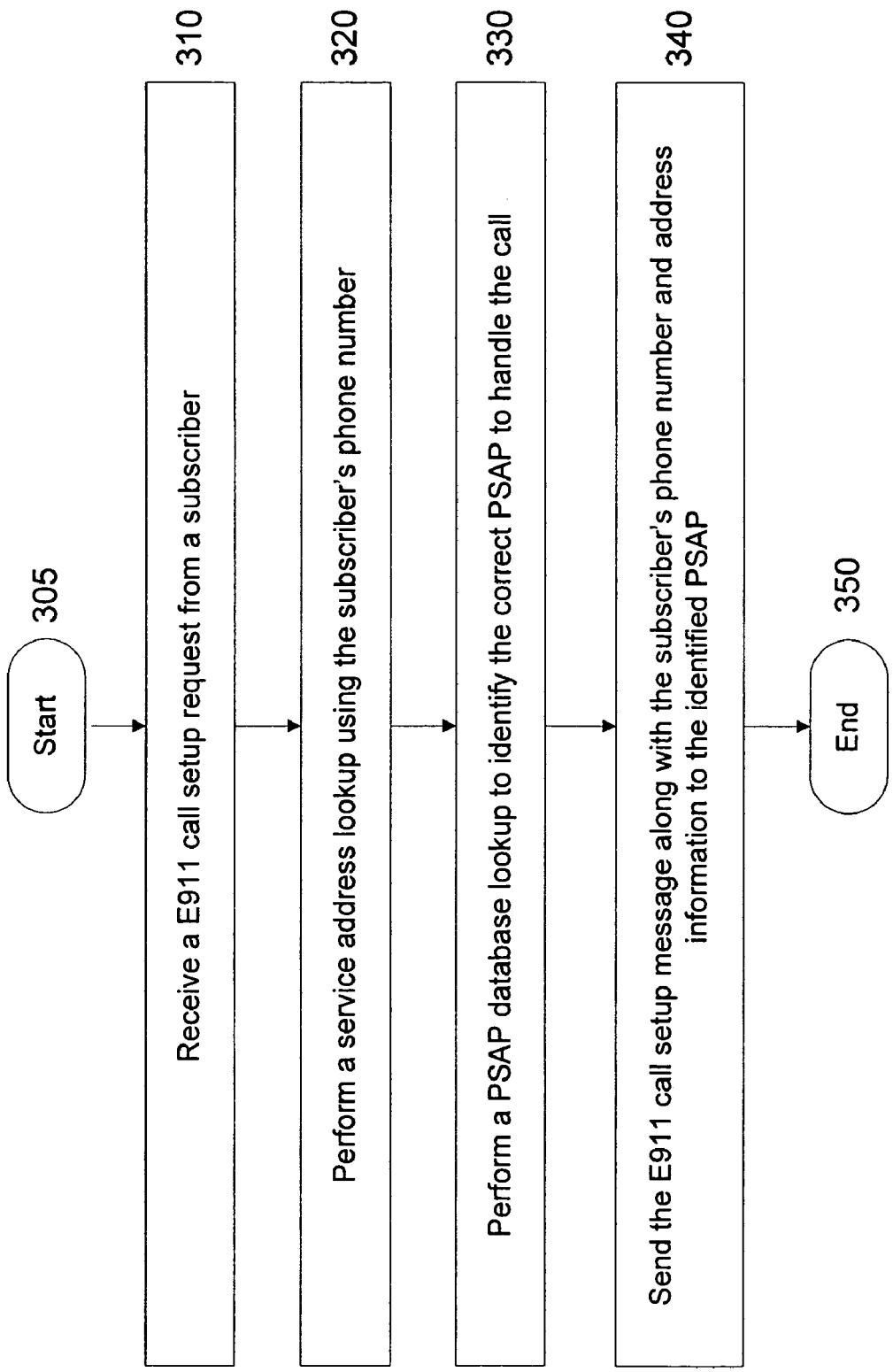
FIG. 3 illustrates a flowchart of a method for supporting out of area phone number for emergency, e.g., E911, services in a packet network, e.g., a VoIP network, of the present invention.

FIG. 3 illustrates a flowchart of a method 300 for supporting out of area phone number for emergency, e.g., E911, services in a packet network, e.g., a VoIP network, of the present invention. Method 300 starts in step 305 and proceeds to step 310.

In step 310, the method receives an E911 call setup message from a subscriber. For example, the E911 call setup message is received by a CCE.

In step 320, the method performs a service address lookup using the subscriber's phone number. The service address lookup request is sent by the CCE to an E911 AS and the service address lookup is performed by the E911 AS.

In step 330, the method performs a PSAP database lookup to identify the correct PSAP to handle the E911 call. The correct PSAP is determined by the E911 AS and forwarded to CCE 211 to be used for call establishment purposes.

In step 340, the method sends the E911 call along with the out-of-area phone number of subscriber 231 and the retrieved service address of subscriber 231 to the identified PSAP and its associated database for call completion. The method ends in step 350.

Figure 4:
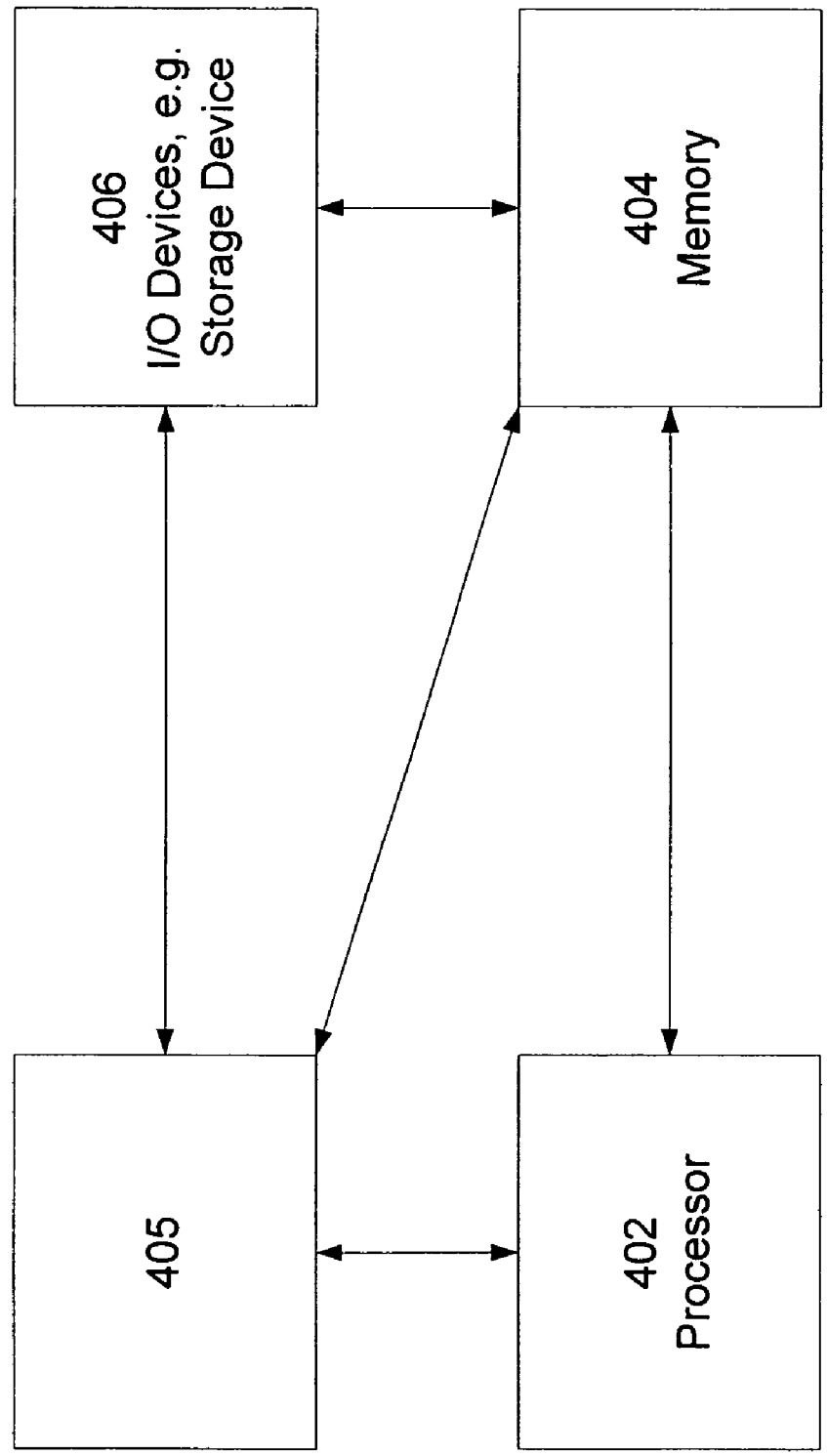
FIG. 4 illustrates a high level block diagram of a general purpose computer suitable for use in performing the functions described herein.

FIG. 4 depicts a high level block diagram of a general purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for supporting out of area phone number for emergency service, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 405 for supporting out of area phone number for emergency service can be loaded into memory 404 and executed by processor 402 to implement the functions as discussed above. As such, the present process 405 for supporting out of area phone number for emergency service (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for supporting an emergency service in a communication network, comprising:

receiving an emergency call setup message from a subscriber using an out of area phone number, wherein said out of area phone number reflects a different geographic location from a service address associated with said subscriber; and sending said emergency call setup message to a Public Safety Answering Point (PSAP), where said PSAP supports a geographic location associated with said service address, wherein said sending comprises:

obtaining said service address of said subscriber using said subscriber's out of area phone number;

identifying said PSAP for receiving said emergency call setup message; and sending said emergency call setup message together with said out of area phone number and said service address to said PSAP.

2. The method of claim 1, wherein said communication network is a Voice over Internet Protocol (VoIP) network or a Service over Internet Protocol (SoIP) network.

3. The method of claim 1, wherein said emergency service is an E911 service.

4. The method of claim 1, wherein said emergency call setup message is received by a Call Control Element (CCE).

5. The method of claim 1, wherein said service address is obtained by a Call Control Element (CCE) from an E911 Application Server (AS).

6. The method of claim 1, wherein said PSAP is identified by an E911 AS and is forwarded to a Call Control Element (CCE) to be used for call completion.

7. The method of claim 1, wherein said emergency call setup message is sent to said PSAP by a Call Control Element (CCE).

8. A computer-readable medium having stored thereon a plurality of instructions, the plurality of instructions including instructions which, when executed by a processor, cause the processor to perform steps of a method for supporting an emergency service in a communication network, comprising:

receiving an emergency call setup message from a subscriber using an out of area phone number, wherein said out of area phone number reflects a different geographic location from a service address associated with said subscriber; and sending said emergency call setup message to a Public Safety Answering Point (PSAP), where said PSAP supports a geographic location associated with said service address, wherein said sending comprises:

obtaining said service address of said subscriber using said subscriber's out of area phone number;

identifying said PSAP for receiving said emergency call setup message; and sending said emergency call setup message together with said out of area phone number and said service address to said PSAP.

9. The computer-readable medium of claim 8, wherein said communication network is a Voice over Internet Protocol (VoIP) network or a Service over Internet Protocol (SoIP) network.

10. The computer-readable medium of claim 8, wherein said emergency service is an E911 service.

11. The computer-readable medium of claim 8, wherein said emergency call setup message is received by a Call Control Element (CCE).

12. The computer-readable medium of claim 8, wherein said service address is obtained by a Call Control Element (CCE) from an E911 Application Server (AS).

13. The computer-readable medium of claim 8, wherein said PSAP is identified by an E911 AS and is forwarded to a Call Control Element (CCE) to be used for call completion.

14. The computer-readable medium of claim 8, wherein said emergency call setup message is sent to said PSAP by a Call Control Element (CCE).

15. An apparatus for supporting an emergency service in a communication network, comprising:

means for receiving an emergency call setup message from a subscriber using an out of area phone number, wherein said out of area phone number reflects a different geographic location from a service address associated with said subscriber; and means for sending said emergency call setup message to a Public Safety Answering Point (PSAP), where said PSAP supports a geographic location associated with said service address, wherein said means for sending comprises:

means for obtaining said service address of said subscriber using said subscriber's out of area phone number;

means for identifying said PSAP for receiving said emergency call setup message; and means for sending said emergency call setup message together with said out of area phone number and said service address to said PSAP.

16. The apparatus of claim 15, wherein said communication network is a Voice over Internet Protocol (VoIP) network or a Service over Internet Protocol (SoIP) network.

17. The apparatus of claim 15, wherein said service address is obtained by a Call Control Element (CCE) from an E911 Application Server (AS).

* * * * *